Aug. 25, 1936.                    O. A. HAGE                    2,052,464
                                 ANTIPICK LOCK
                              Filed July 13, 1934                4 Sheets-Sheet 1

O. A. Hage
INVENTOR

By: Marks & Clerk
        Attys.

Aug. 25, 1936.  O. A. HAGE  2,052,464
ANTIPICK LOCK
Filed July 13, 1934  4 Sheets-Sheet 3

O. A. Hage
INVENTOR

By Marks & Clerk
Attys.

Aug. 25, 1936.  O. A. HAGE  2,052,464

ANTIPICK LOCK

Filed July 13, 1934  4 Sheets-Sheet 4

Patented Aug. 25, 1936

2,052,464

UNITED STATES PATENT OFFICE 2,052,464

ANTI-PICK LOCK

Olof Alfred Hage, Gothenburg, Sweden

Application July 13, 1934, Serial No. 735,058
In Sweden October 12, 1932

23 Claims. (Cl. 70—14)

The present invention refers to anti-pick locks for bank vaults, safes, and the like, in which a spindle extends through the door and adjustment into unlocking position of tumblers provided in the lock is effected by a stepwise axial displacement of the spindle in one and the same direction, alternating with turning movements in each axial position.

The object of the invention is to provide an anti-pick lock which constitutes an entirely reliable and inexpensive substitute for the combination locks known hitherto, whereby the disadvantages of the uncertainty involved by the necessity of remembering the combination for which the lock is adjusted for the time being are entirely obviated.

A further object of the invention is to provide an anti-pick lock which can be readily adjusted for a key of other construction, which is of great advantage if the responsibility for the opening of bank vaults or safe doors, for example, is to be transferred from one person to another.

A further object of the invention is to provide an anti-pick lock with a key of such construction that the same cannot be used for the lock should it come into the hands of an unauthorized person.

The present invention is principally distinguished by members for the guidance of the spindle during its movements, so arranged that unlocking of the lock is effected by turning and returning of the spindle in each axial position provided for the adjustment of the tumblers, and by a key for limiting the turning movement of the spindle in the one direction in each such axial position.

In order that the invention may be readily understood, an embodiment of the invention is illustrated by way of example in the accompanying drawings, the locking mechanism being divided in two lock housings, one on each side of the door.

In the drawings, Figs. 1-10 show the inner lock housing with appertaining parts. Figs. 11-17, 20 and 21 show the outer lock housing with the lock parts provided therein. Figs. 14, 15, 16, 17, and 21 show details pertaining to the device. Fig. 18 shows a key adapted for the lock in elevation and in an embodiment with a portion of an appertaining cover plate cut away. Fig. 19 shows the key viewed from above. Figs. 22-27 show the key as a combination key according to a second embodiment.

The inner housing of the lock according to Figs. 1-10 comprises a bottom plate 2, which is secured by means of screws 5 to the inside of the door 1, and side walls 3 and 4, which are provided with slots to receive cover plates 6 and 7. The bottom plate 2 is provided with bosses 8, 9, 10 and 11, of which the boss 8 is higher than the others. Provided in the bottom plate 2 are two pins 13 and 14, while a hub 12 is secured in a hole.

Figure 8:
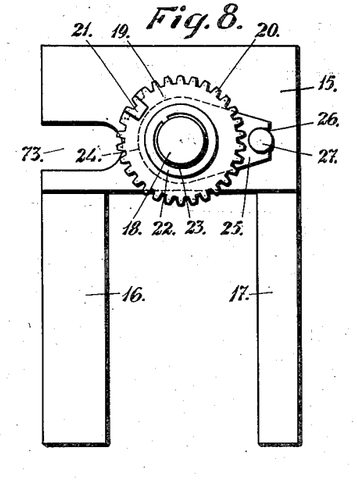

A plate 15, Fig. 8, provided with two guide legs 16 and 17, is displaceably mounted in slots provided in the bosses 8, 9, 10 and 11.

The tumblers 19 of the lock are formed as gear wheels with teeth 20 and are rotatably mounted on a bolt 18 secured in the plate 15 and provided each with a notch 21 in the peripheral portion thereof.

In the embodiment shown, there are five tumblers, but a smaller or greater number of tumblers may be brought into use, if found suitable.

In order that the tumblers 19 shall not slide off the bolt 18, a ring 22 is placed on the latter, said ring being retained by a spring ring 23 clamped into a groove in the bolt 18. The tumblers are separated by intermediate washers 24, each provided with a projection 25 with a notch 26 engaging a pin 27 secured in the plate 15. By this means, the intermediate washers 24 are guided so as not to turn, and prevent the turning of a tumbler by the turning of an adjacent tumbler.

Figures 1, 2, 3, 4, 5:
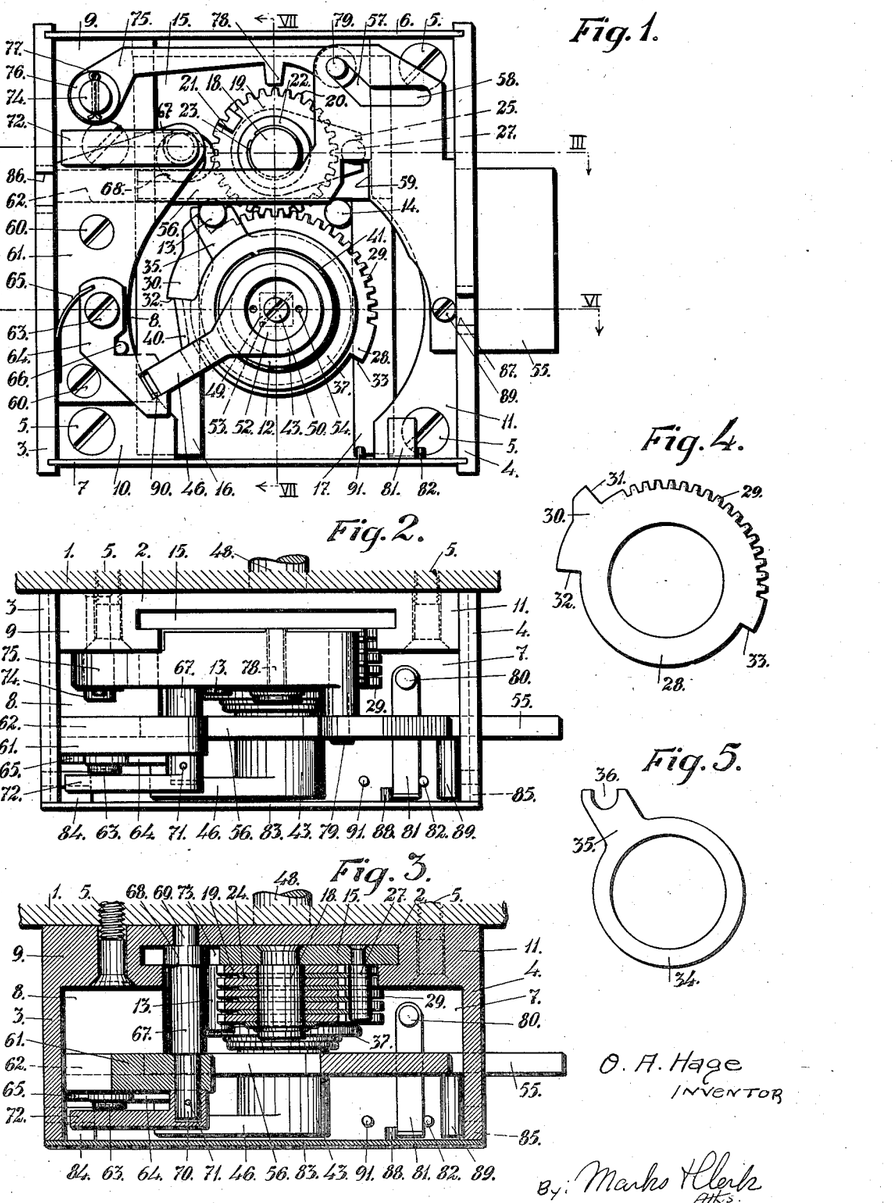
Fig. 1 is a view of the arrangement from the inside of the door, the side cover of the lock being removed.
Fig. 2 shows the arrangement viewed from above, an upper cover plate being removed.
Fig. 3 is a section on line III—III, Fig. 6 a section on line VI—VI and Fig. 7 a section on line VII—VII in Fig. 1.
Figs. 4, 5, 8, 9, and 10 illustrate details pertaining to the device.

On the hub 12, there are provided rings 28 rotatably mounted, these rings 28 having the appearance shown in Fig. 4. For a portion of their periphery they are provided with teeth 29 engaging the teeth 20 of the tumblers when the latter teeth are in their normal position, as shown in Fig. 1. Each ring is provided with a boss 30 forming an abutment 31, and the portion of the periphery of the ring between the boss 30 and the teeth 29 has a smaller radius, so that two further abutments 32 and 33 are formed. The rings 28 are separated by intermediate washers 34, Fig. 5, each of which is provided with a projection 35 forming a notch 36 engaging the pin 13, so that the intermediate washers are guided against a turning movement and prevent that the turning of one ring actuates the adjacent ring.

Figure 6:
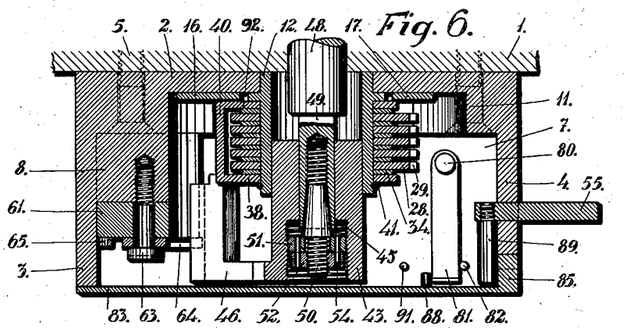
Figure 7:
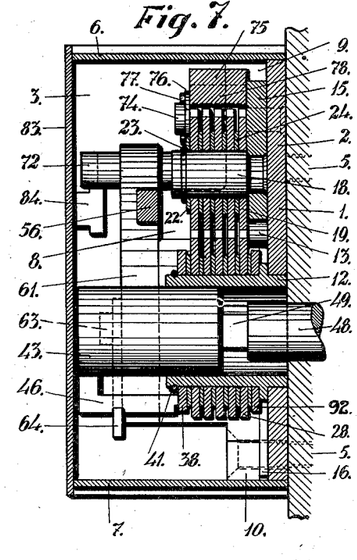
Figure 10:
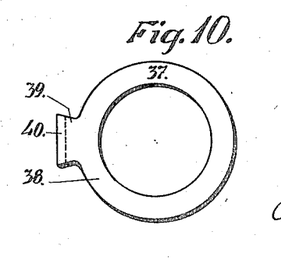

In addition, the hub 12 is provided with a returning member 37 for the rings 28, see Figs. 6 and 10, which member is rotatably mounted, and the rings 28 and the intermediate washers 34 are placed between the two annularly shaped end portions 38, 92 thereof, which end portions are each provided with a projection 39, these projections being united by means of a cross piece 40. The returning member 37 is intended on the return movement to catch the abutments 32 by means of the cross piece 40, and to return all the rings 28 and the tumblers 19 to the zero position, that is to say the position they have to take when the lock is locked.

Outside the returning member 37 there is a spring ring 41 clamped into a groove provided in the hub 12, so that the parts cannot slide off the hub.

Figure 9:
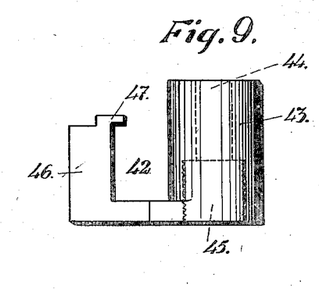

In the hub 12 is provided an angular arm 42 of the appearance shown in Fig. 9, said arm being rotatably and displaceably mounted by means of a central portion 43. Extending from the portion 43 is an angularly shaped arm 46 provided with a projection 47 directed radially inwards. The portion 43 has a central bore forming a threaded hole 45 and in the extension thereof a hole 44 of square cross-section fitting to the square inner end 49 of the lock spindle 48, the portion 43 being thrust onto said inner end. The end of the spindle is cut diagonally by a groove 53, and is bored and threaded for a taper screw 50, the outer end of which is also threaded. A nut 51 is externally threaded for the hole 45, but its central hole does not engage the threads of the taper screw 50. Threaded onto this screw is a nut 52, the diameter of which is smaller than the hole 45. The holes 54 as shown in the nuts are intended for the turning of the nuts by means of a suitable wrench. When the angular arm 42 is adjusted in its proper axial position, the taper screw 50 is turned so that its conical portion expands the square portion 49, thus preventing play of the angular arm 42 on the spindle. The nut 51 is then applied and after that the nut 52, so that the angular arm cannot slide on the spindle.

The angular arm 42 is in the embodiment shown intended to take six axial positions, and in five of these the projection 47 is opposite any of the abutments 33, so that on turning the arm one of the rings 28 as well as a tumbler 19 will be turned. In its innermost axial position the projection 47 is free from the abutments 33 but lies in the path of the returning member 37, so that the latter is entrained on the returning movement of arm 42.

The bolt 55 of the lock is displaceably mounted in an aperture in the side wall 4 and extends in Fig. 1 toward the left into the lock casing, thus forming the bolt shank 56. Provided in the bolt 55 is an angular slot 57, 58 and a notch 59, which latter may be engaged by the arm 46 in a certain position for the displacement of the bolt.

Secured on the boss 8 by means of screws 60 is a cap 61 which is provided with a slot 62 for the guidance of the bolt shank 56. A lever arm 75 swingably mounted at the boss 9 on a stud 74 is disposed over the tumblers 19 and provided with a pin 79 engaging the angular slot 57, 58, as well as with a cross member 78 extending over all of the tumblers 19. A washer 76 and a cotter pin 77 secure the lever arm 75 to the stud 74.

If in the locked position of the lock the bolt is pressed inwardly, the pin 79 will press the cross member 78 against the teeth 20, so that an inward movement of the bolt is made impossible, but if the notches 21 of all of the tumblers are beneath the cross member 78, the latter swings into the notches, thus permitting a free inward displacement of the bolt.

Rotatably secured to the boss 8 by means of a screw 63 is a pawl 64 which is pressed by a spring 65 against a pin 66 secured in the cap 61. When the arm 46 is turned against the pawl 64 (to the left in Fig. 1), the latter is moved sidewise, but again takes its normal position, engaging the arm 46 with the notch 90, when this arm is brought into the position shown in Fig. 1, whereby the spindle 48 is locked in its innermost axial position against turning movements.

A shaft 67 is rotatably mounted in the bottom plate 2 and the cap 61 by means of journals 69, 70. Journal 70 extends through the cap, and secured to the free end thereof by means of a pin 71 is a lever 72. The shaft 67 is provided with an eccentric 68 fitting into a slot 73 provided in the plate 15. When the lever 72 is turned, the eccentric will impart a vertical movement to the plate 15, so that the teeth 20 of the tumblers 19 are brought out of engagement with the teeth 29 of the rings 28.

Secured in the cover plate 7 by means of a rivet 80 is an angularly bent arm 81, the movements of which are limited by two pins 82, 91 secured in the same cover plate. A pin 88 is also secured in the cover plate 83 of the lock housing, and this cover plate is provided with two T-shaped bosses 84 and 85 fitting into the slots 86 and 87 of the side walls 3 and 4 respectively. When the lock is locked, a pin 89 secured in the bolt 55 and the pin 88 prevent lateral displacement of the cover plate 83, while the bosses 84 and 85 prevent the lifting off of the same. When the lock is unlocked, the pin 89 does not prevent displacement of the cover 83, but the bosses 84 and 85 may be brought out of engagement with the slots 86 and 87 through the displacement, so that the cover 83 can be lifted off.

The outer lock casing according to Figs. 11–14 comprises a bottom plate 100 secured by means of screws 101 to the outer side of the door 1, and a cap 102 retained on the bottom plate by means of screws 103. The spindle 48 of the lock is rotatably and displaceably mounted in a hole in the bottom plate 100. Its outer end is formed into a square head 104, and is provided with a taper screw 105, similar to its inner end 49 situated in the inner lock housing. Provided on the spindle end 104 are a disk 107 and an eccentric 108, separated by a ring 109, which parts have square apertures corresponding to the spindle end, and are retained in their position by a nut 106. The disk 107 is provided with two notches 110 and 111 and a projection 112. The notch 111 is of greater, preferably double, the width of the notch 110.

Provided in the bottom plate 100 is a groove 113, against the bottom of which the key of the lock abuts, and a groove 114, in which a locking slide 115 is displaceably mounted. The latter is provided with a tongue 116 radially disposed relatively to the spindle and directed toward the key, the free end of said tongue being formed into a tooth 117, and with an upwardly directed arm 118 disposed on the opposite side of the spindle. The rear part of the locking slide 115, with respect to the tongue 116, is bent into an arm 120, so that a flat spring 122 secured in the cap 102 by means of a rivet 121 can bear thereagainst and keep the locking slide 115 pressed against a pin 119 secured in the disk 107.

A plate 124 is secured by means of a screw 123 in the bottom plate 100 and retains the locking slide 115 in the groove 114.

A shaft 126 provided with a turning knob 128 situated outside the front side of the cap forms an extension of the spindle 48 and extends through a hole in the cap 102. At the inner end the shaft is provided with a flange 125 and has a central hole for the nut 106 of the taper screw 105, and is retained at the eccentric 108 by means of screws 127.

The turning knob 128 is retained on the shaft 126 by means of a pin 130 extending through the shaft and the inner portion 129 of the turning knob entering a hole provided in the outer end of the shaft. The spindle and all parts secured thereon must thus follow all movements of the turning knob.

Figures 13, 14, 15, 16, 17, 18, 19:
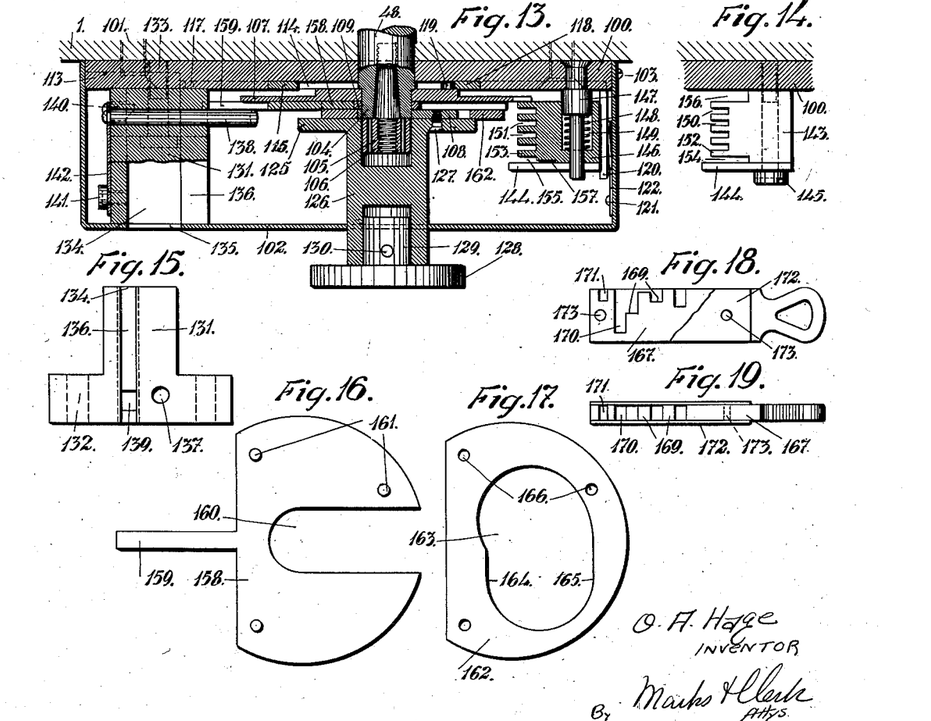

Provided within the cap is a key casing 131 of the appearance shown in Fig. 15 and provided with flanges in which apertures 132 are provided for screws 133 adapted to retain the key casing at the bottom plate 100. Provided in the key casing is a key hole 134 which forms the slot 136 open toward the spindle 48 and a hole 137 for a rod 138 directed substantially toward the spindle and extending in front of the peripheral portion of the disk 107. In addition, the key casing has a hole 139, in which a bevelled block 140 is arranged, said block extending into the key hole 134. Secured on the key casing 131 by means of a screw 141 is a leaf spring 142, to which the rod 138 and the block 140 are secured, so that these parts are kept pressed in a direction toward the spindle 48. The rod 138 prevents an axial outward movement of the spindle 48, but when the key is introduced into the key hole 134, the block 140 is moved backwardly by the key, the rod 138 having then also been moved back out of the path of the disk 107, so that the spindle 48 can be pulled freely outwards.

Secured to the bottom plate 100 by means of a screw 145 are a plate 144 and a block 143, and provided beside the latter is a block 146, the plate then covering the two blocks. The block 146 is displaceably mounted on a pin 147 secured in the bottom plate 100 and is kept pressed against the plate 144 by means of a spring 148 placed around the pin 147. The block 143 is of such a width that it may be received in the notch 110 of the disk 107 and both blocks together in the notch 111 of the same disk.

Figures 11, 12:
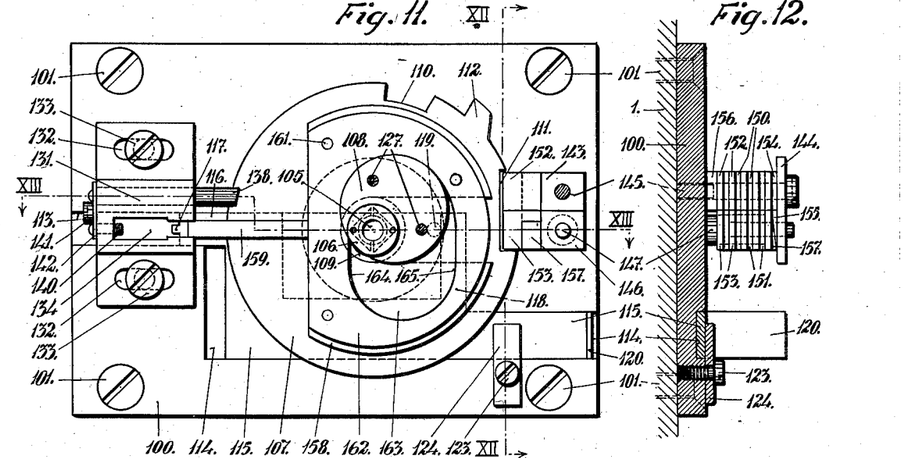
Fig. 11 shows the same viewed from the outside of the door, the cap and the turning knob for the spindle with the appertaining turning shaft being removed.
Fig. 12 is a section on line XII—XII, and Fig. 13 a section on line XIII—XIII in Fig. 11.
Figure 21:
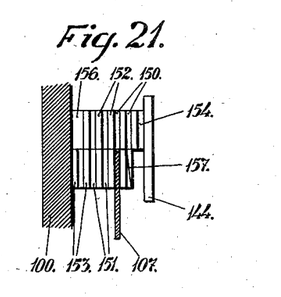

Provided in the two blocks are slots 150 and 151 directed radially toward the spindle 48, said slots being defined by teeth 152 and 153. The outermost teeth of the blocks 143, 146 form, together with the plate 144, slots 154 and 155 respectively. The innermost tooth of the block 143 forms with the bottom plate 100 a slot 156. The block 146 is bevelled on the outer side, as shown in Figs. 12, 13, and 21, the bevelled portion 157 forming an extension of the slot 155.

The slots 150, 151, 154 and 155 are preferably of the same width as the thickness of the teeth 152, 153, and the width of the slot 156 is the same as the width of a slot 151 plus the thickness of a tooth 153, which total measure corresponds to the thickness of a ring 28 plus an intermediate washer 34, Fig. 6, the block 146 being also in the same measure shorter than the block 143. Therefore, when the block 146 is displaced to abut against the bottom plate 100, which displacement is here referred to as "an axial step", this corresponds to a displacement from a ring 28 to the adjacent ring 28.

The slots 150, 151 and 155 are of such a depth that the periphery of the disk 107 may pass the same, while this is not the case with the projection 112, whereas the slots 154, 156 are of such a depth that the projection 112 can also pass on a rotary movement of the disk 107. When the projection 112 is turned against the bevelled portion 157, it is permitted to pass, inasmuch as the block 146 is pushed away against the action of the spring 148, whereas on turning in the opposite direction it cannot pass the block.

A slide or stop disk 158, Fig. 16, disposed between the disk 107 and the eccentric 108 embraces the ring 109 with a radial slot 160, and is formed with a tongue 159 extending in the continuation of the slot 160 into the key hole 136, and is of such a length that it may be moved inwardly against the key. Through the guidance of the stop disk 158 by the ring 109 and the key hole slot 136 the same will have a rectilinear movement on its displacement.

The eccentric 108 may be surrounded by an eccentric frame 162, Fig. 17, the opening 163 of which for the eccentric is extended downwardly, so that the eccentric on its downward rotary movement is not impeded by the eccentric frame which is displaced laterally in a direction toward or from the key, when the eccentric 108 reaches either the frame edge 164 or 165. Apertures 166 provided in the eccentric frame fit over pins 161 secured in the stop disk 158, which pins engage the apertures so that the eccentric frame will also be rectilinearly guided and entrains the stop disk 158 in its movement.

The key intended for the lock may be of any suitable shape and construction. It may, for instance, take the form illustrated in Figs. 18 and 19, in which the key consists of an intermediate part 167 provided on both sides with cover plates 172 secured by means of rivets 173 or the like. The intermediate part is formed with a number of abutments 169 corresponding to the number of tumblers 19 used in the lock. The width of each abutment is equal to an axial step. It is the abutments 169 which by the tongue 159 displaced toward them on the rotary movement of the spindle limit the radial movements of the eccentric frame 162, whereby the rotary movement of the spindle 48 in different axial positions is limited. Besides, a notch 170 is provided in the intermediate part 167 and is of such a depth that the displacing movement of the tongue 159 will not be stopped when the tongue 159 is in front of said notch. There is also provided a notch 171 which may be engaged by the tooth 117.

Figures 22, 23, 24, 25, 26, 27:
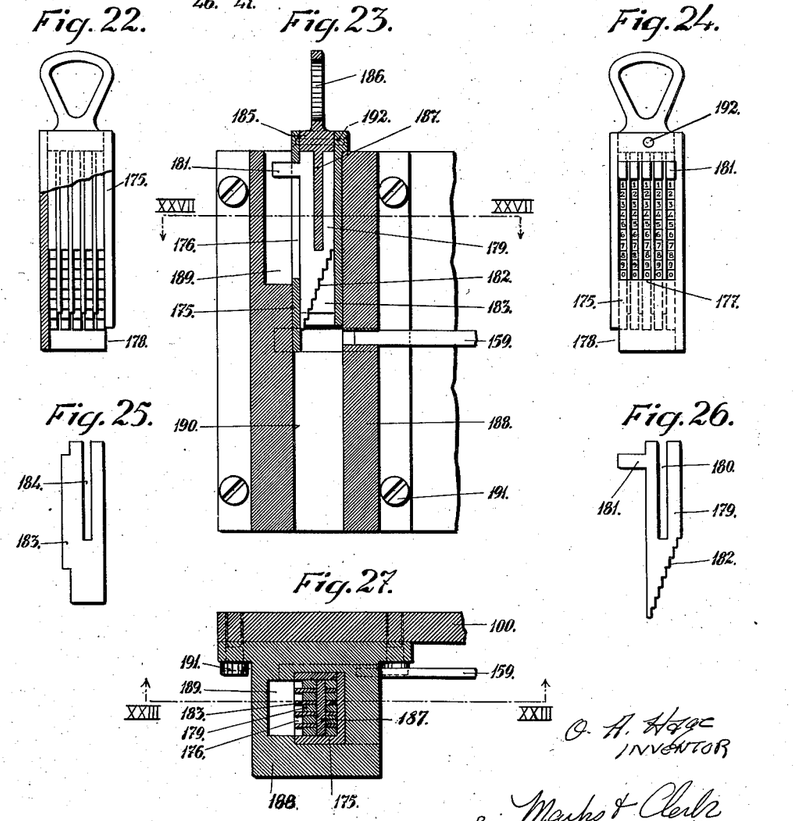
Fig. 22 shows the same in front view with a portion of an appertaining sleeve cut away.
Fig. 24 is a rear view of the key.
Figs. 25 and 26 show details of the key.
Figs. 23 and 27 show the key as being introduced into the lock, partly in longitudinal section on line XXIII—XXIII in Fig. 27, and partly in cross-section on line XXVII—XXVII in Fig. 23.

In Figs. 22–27, the key is illustrated as an adjustable combination key. This key consists of a sleeve 175, in which displaceable laminations 179, Fig. 26, are provided, the laminae in question being separated by intermediate washers 183, Fig. 25. A plate 185 shaped into a key ring 186 and formed with a web 187 fitting into slots 180 and 184 in the laminae 179 and the intermediate washers 183 is secured in the sleeve 175 by means of a rivet 192. At the rear, the sleeve is provided with a longitudinal opening 176 having projections 181 from the laminae extending therethrough. Each lamina is shaped stepwise so as to form a number of abutments 182, which are numbered preferably by the straight edges of the laminae directed toward the opening being provided with numbers corresponding to the abutments. Provided in the lower portion of the sleeve is a recess 178, so that movement of the tongue 159 in its innermost position is not prevented. In this embodiment, the key is introduced from above, by reason of which the key hole 190 is vertically arranged in the key casing 188, which is retained at the lock plate 109 by means of screws 191. By means of the projections 181 the laminae may be moved into different positions for a certain selected number which may be read off at the lower edge 177 of the opening 176. When adjusted in this manner, the abutments 182 in front of the tongue 159 thus form a series of horizontal abutments corresponding to the abutments of the previously described simple key.

The operation of the device is as follows:

As will be understood from the above, the turning knob 128 cannot be turned or pulled out when the lock is in locked position, as illustrated in Figs. 1, 2, 3, 6, 7, 11 and 13.

If the key be introduced into the key hole 134, the rod 138 will be pushed back so that the spindle is released. The turning knob 128 is then pulled straight out, the movement being impeded when the guide disk 107 strikes against the plate 144. The tongue 159 is then in front of the outer one of the abutments 169 of the key and the projection 47 in front of the outer ring 28. The arm 46 has slidden out of the notch 90, so that the rotary movements of the spindle are no longer prevented. The pin 119 has been moved away from the locking slide 115, and the latter has been displaced by the spring 122 toward the key, the tooth 117 having then entered the notch 171 in the key, so that the latter cannot be taken out.

If the turning knob is now turned to the right, in a clockwise direction when viewed from outside the door, the tongue 159 will be displaced by means of the eccentric 108 so as to strike against the outer abutment 169 of the key. The outer tumbler will then be turned in a corresponding degree by means of the projection 47. If the proper key is used, the notch 21 of the tumbler 19 in question will be adjusted right underneath the cross member 78.

At the rotary movement the peripheral portion of the disk 107 enters the slot 154 and guides the spindle 48 against axial displacement. At the rotary movement the returning member 37 is also entrained by the ring 28.

Figure 20:
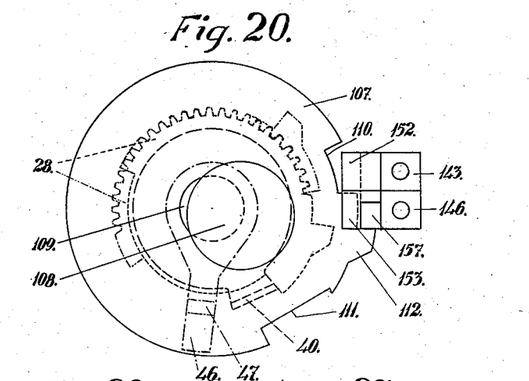
Fig. 20 is a diagrammatic representation of the cooperating parts.

Rotary movement then takes place in the opposite direction, until the projection 112 strikes against the block 146. The active parts, when viewed from the outside of the door, then take the position shown in Fig. 20, the arm 46 not reaching as far as to the cross member 40 of the returning member, so that disturbing of the position of an adjusted ring 28 is prevented. That part of the periphery of the disk 107 which is between the notch 110 and the projection 112 is at the same time situated in the slot 155 in the axially displaceable block 146. The turning knob 128 is now pressed inwardly and then entrains the block 146 by means of the disk 107, until said block forms an abutment against the bottom plate, that is to say an axial step, the disk 107 then being brought in front of the first slot 150 in the block 143, while the projection 47 is brought in front of the next ring 28. Rotation is then effected to the right, and the last-mentioned ring 28 is caught by the projection 47, the notch 21 on the corresponding tumbler being adjusted underneath the cross member 78, so that the movement is limited by the next abutment 169 of the key. When at this rotation the notch 110 is brought opposite the block 146, the latter is returned by the spring 148 to abut against the plate 144, while the disk 107 remains in its axial position, guided by the slot 150 in the block 143. After the adjustment of the tumbler the disk 107 is returned, as before, until the projection 112 strikes against the block 146, whereupon the turning knob with the spindle is again pressed in by an axial step.

The turning movements and the axial displacements are then continued in the same manner, until after the fifth turning movement to the right the notches 21 of all tumblers are underneath the cross member 78.

After the fifth axial step the disk 107 will be located in the slot 156, so that the sixth turning movement to the right is no longer impeded by the abutment 169 of the key, the arm 46 continuing until it abuts in the notch 59 of the bolt 55 so as to press the latter inwardly. The cross member 78 can now swing into the notch 21, and the inward displacement of the bolt is not prevented, but the bolt is moved into unlocking position when the rotary movement is continued.

If the lock is again to be locked, a turning movement is effected in the opposite direction from the abovementioned unlocking position brought about by the last rotary movement in a clockwise direction. The arm 46 then displaces the bolt outwardly into locking position, the cross member 78 being then lifted out of the notch 21. The projection 47 catches the cross piece 49 of the returning member, which cross piece returns all of the rings 28, these latter then entraining the tumblers 19. The arm 46 moves the pawl 64 sidewise, until the arm engages the notch 90 thereof. In the last portion of the rotary movement the pin 119 has moved the locking slide 115 toward the spring 122, so that the tooth 117 has been caused to leave the notch 171 of the key, which latter can then be taken out. The lock is now again locked, and all parts take their initial positions.

Adjustment of the lock for another key is effected as follows. The lock is unlocked, the cover plate 83 is removed as previously described, and the arm 81 is turned against the rear pin 91. The turning knob 128 is then turned until the arm 46 abuts against the bent-up portion of the arm 81, which portion is now in the way of the arm 46. At this movement the bolt 55 is moved into a locked position and the pin 79 guided by the slot 57 lifts the cross member 78 out of the notch 21. The tumblers 19, however, are not turned on the stopping of the movement of the arm 46, before it has reached the cross piece 40 of the returning member. The lever 72 is now turned half a revolution, the frame 15 carrying the tumblers being then raised so that the teeth 20 of the tumblers are brought out of engagement with the teeth 29 of the rings 28. The arm 81 is then returned into its former position and the turning knob 128 into locking position, the rings 28 being also turned into locking position, without altering the angular position of the tumblers 19. The key is now removed and the new key inserted instead. The manner of operation is then as in unlocking. The rings 28 are then turned, their turning angles being determined by the abutment of the new key. After the adjustment the lever 72 is turned back, so that the tumblers again engage the rings, whereupon the cover plate 83 is again brought in place. The turning knob 128 is then turned into locking position, each ring 28 turning a tumbler by a certain angle. In order that the lock may now be unlocked, it is necessary that each tumbler be turned back by exactly the same angle, and these angles are determined by the abutment of the new key, for which key the lock is now adjusted.

The details of the arrangement may obviously be subjected to a number of different modifications within the scope of the appended claims. The stepwise axial movement of the spindle may be effected outwardly instead of inwardly as above described for the embodiment shown in the drawings. The guide slots may be provided in the spindle, and the disk 107 or a corresponding part may be secured in the lock housing.

What I claim is:—

1. In an anti-pick lock, a rotatory and axially displaceable spindle extending through the door, tumblers adjusted into unlocked position by a limited turning movement of said spindle in one direction in each one of a number of axial positions, means cooperating with a key for limiting said turning movements of the spindle, and members for guiding the spindle during its movements, so arranged that unlocking of the lock is effected by turning of the spindle and returning of the same in each axial position intended for the adjustment of the tumblers.

2. An anti-pick lock according to claim 1, in which the means cooperating with the key comprise a slide movable toward the key, and an eccentric provided on the spindle and arranged for moving said slide.

3. In an anti-pick lock, a movable spindle extending through the door, toothed tumblers disposed laterally with respect to said spindle, and adjusted into unlocked position by a stepwise axial displacement of said spindle in one and the same direction, alternating with turning movements in each axial position, toothed intermediate members engaging said tumblers, each member being adapted for transmission to the respective tumbler of the rotatory movement of the spindle in one axial position, and members for guiding the spindle during its movements, so arranged that the unlocking of the lock is effected by turning of the spindle and returning of the same in each axial position intended for the adjustment of the tumblers.

4. An anti-pick lock according to claim 3, in which the toothed intermediate members are formed as rings disposed concentrically with the spindle.

5. In an anti-pick lock, a movable spindle, tumblers adjusted into unlocked position by a stepwise axial displacement of said spindle in one and the same direction, alternating with turning movements in each axial position, members for guiding the spindle during its movements, so arranged that unlocking of the lock is effected by turning of the spindle and returning of the same in each axial position intended for the adjustment of the tumblers, notches in said tumblers, a cross member adapted to engage said notches, when the tumblers are brought into unlocked position, a bolt for the lock, means provided in said bolt and said cross member for bringing the cross member into and out of engagement with said notches, when the lock is unlocked and locked, respectively, an arm provided on the spindle, which in the different axial positions of the spindle is arranged to be adjusted opposite the respective tumblers for the actuation thereof during the turning movement, and a notch in the bolt of the lock adapted to be engaged by said arm for the displacement of the bolt into locked and unlocked position upon turning of the spindle.

6. In an anti-pick lock, a movable spindle extending through the door, tumblers adjusted into unlocked position by a stepwise axial displacement of said spindle in one and the same direction, alternating with turning movements in each axial position, a guide disk secured on the spindle, a plurality of teeth directed radially to the spindle and disposed beside one another in the axial direction, and adapted for cooperation with said guide disk, said teeth serving as guide members for the spindle during its axial displacement in a certain angular position, and also forming guide slots for the spindle at the turning thereof in each axial position.

7. An anti-pick lock according to claim 6, in which a means cooperating with a key is provided for limiting the turning movements of the spindle in the one direction in each axial position.

8. In an anti-pick lock, a rotatory and axially displaceable spindle extending through the door, tumblers adjusted into unlocked position by a single turning movement of a certain degree in one direction in each one of different axial positions of the spindle, members for guiding the spindle during its movements, so arranged that unlocking of the lock is effected by turning of the spindle and returning of the same in each axial position, an arm secured on the spindle and adapted to actuate the respective tumblers during the turning movements in the different axial positions of the spindle.

9. In an anti-pick lock, a movable spindle extending through the door, tumblers disposed laterally with respect to said spindle, and adjusted into unlocked position, by a stepwise axial displacement of said spindle in one and the same direction, alternating with turning movements in each axial position, intermediate members adapted for transmission of the movement of the spindle to said tumblers, members for guiding the spindle during its movements, so arranged that unlocking of the lock is effected by turning of the spindle and returning of the same in each axial position intended for the adjustment of the tumblers, and an arm operated by the spindle, and arranged to be adjusted opposite the respective intermediate members for the actuation thereof during the turning movements in the different axial positions of the spindle.

10. An anti-pick lock according to claim 9, in which a means cooperating with a key is provided for limiting the turning movements of the spindle in the one direction in each axial position of the spindle.

11. In an anti-pick lock, a rotatory and axially displaceable spindle extending through the door, tumblers adjusted into unlocked position by a limited turning movement of said spindle in one direction in each one of a number of axial positions, means cooperating with a key for limiting said turning movements of the spindle, members for guiding the spindle during its movements, so arranged that unlocking of the lock is effected by turning of the spindle and returning of the same in each axial position intended for the adjustment of the tumblers, a locking rod displaceably mounted in the lock and disposed with its one end in the path of one of said guide members incorporated with the spindle and adapted to prevent axial displacement of said guide member, when the key is out of the lock, a spring adapted to retain said locking rod in locking position, and a displaceable boss reaching into the path of the key in the key hole and adapted to be displaced upon introduction of the key, said boss being incorporated with said retaining spring and the locking rod and adapted to entrain the spring and the locking rod upon displacement of the boss for making the guide member free to move.

12. In an anti-pick lock, a movable spindle extending through the door, toothed tumblers disposed laterally with respect to said spindle, and adjusted into unlocked position by a step-wise axial displacement of said spindle in one and the same direction, alternating with limited turning movements in each axial position, a displaceable means cooperating with a key for limiting said turning movements of the spindle in one direction, toothed intermediate members engaging said tumblers, each member being adapted for transmission on to the respective tumbler of the rotatory movement of the spindle in one axial position, and members for guiding the spindle during its movements, so arranged that the unlocking of the lock is effected by turning of the spindle and returning of the same in each axial position intended for the adjustment of the tumblers.

13. In an anti-pick lock, a movable spindle extending through the door, toothed tumblers mounted on a displaceable carrier and disposed laterally with respect to said spindle, and adjusted into unlocked position by a stepwise axial displacement of said spindle in one and the same direction, alternating with turning movements in each axial position, toothed intermediate members engaging said tumblers, each member being adapted for transmission on to the respective tumbler of the rotatory movement of the spindle in one axial position, means for displacing said carrier and disengaging the tumblers and the intermediate members so that the intermediate members may be reset independently of the tumblers to correspond to other turning movements of the spindle, and so that upon reengagement of the tumblers and the intermediate members, the adjustment of the tumblers in unlocked position of the lock is dependent upon said other turning movements of the spindle, and members for guiding the spindle during its movements, so arranged that the unlocking of the lock is effected by turning of the spindle and returning of the same in each axial position intended for the adjustment of the tumblers.

14. In an anti-pick lock, a rotatory and axially displaceable spindle extending through the door, tumblers adjusted into unlocked position by a single turning movement of a certain degree in one direction in each one of different axial positions of the spindle, displaceable means cooperating with a key for confining said turning movements to said degrees, members for guiding the spindle during its movements, so arranged that unlocking of the lock is effected by turning of the spindle and returning of the same in each axial position, and an arm secured on the spindle and adapted to actuate the respective tumblers during the turning movements in the different axial positions of the spindle.

15. An anti-pick lock according to claim 8, in which the tumblers are disposed laterally with respect to the spindle, intermediate members consisting of rings, provided with teeth and disposed concentrically with the spindle, being provided for transmission of the movement of the spindle to said tumblers.

16. An anti-pick lock according to claim 8, in which the tumblers are disposed laterally with respect to the spindle, intermediate members consisting of rings, provided with teeth and disposed concentrically with the spindle, being provided for transmission of the movement of the spindle to said tumblers, a returning member being provided for returning the tumblers into zero position, and in which the arm secured on the spindle has an abutment adapted to engage said returning member in the one extreme axial position of the spindle and to return the returning member and the tumblers into zero position on returning of the spindle.

17. In an anti-pick lock, a rotatory and axially displaceable spindle extending through the door, tumblers adjusted into unlocked position by a limited turning movement of said spindle in one direction in each one of a number of axial positions, means cooperating with a key for limiting said turning movements of the spindle, members for guiding the spindle during its movements, so arranged that unlocking of the lock is effected by turning of the spindle and returning of the same in each axial position intended for the adjustment of the tumblers, an arm incorporated with the spindle, and a pawl adapted to catch said arm and thereby to lock the spindle against turning in the locked position of the lock, said pawl and the arm being so disposed relatively to one another that the arm is released on an axial displacement of the spindle and that the spindle is then free to turn.

18. An anti-pick lock according to claim 6, in which a guide disk is secured on the spindle, and the plurality of teeth directed radially to the spindle and disposed beside one another in the axial direction of the spindle are formed on a fixed block and a block displaceable in the axial direction by an axial step, slots formed between said teeth and serving as guide slots for said disk being so arranged in the two blocks that they correspond to one another and form continuous slots in two extreme positions of displacement of said displaceable block.

19. An anti-pick lock according to claim 6, in which a guide disk is secured on the spindle, and the plurality of teeth directed radially to the spindle and disposed beside one another in the axial direction of the spindle are formed on a fixed block, and a block displaceable in the axial direction by an axial step, slots formed between said teeth and serving as guide slots for said disk being so arranged in the two blocks that they correspond to one another and form continuous slots in two extreme positions of displacement of said displaceable block, a notch being provided in said guide disk of such a width that the guide disk in a certain angular position of the spindle is axially displaceable past the two blocks, and a second notch in said guide disk of such a width that the guide disk in another angular position of the spindle is axially displaceable past the fixed block, while the displaceable block is entrained by an axial step.

20. An anti-pick lock according to claim 6, in which a guide disk is secured on the spindle, and the plurality of teeth directed radially to the spindle and disposed beside one another in the axial direction of the spindle are formed on a fixed block, and a block displaceable in the axial direction by an axial step, slots formed between said teeth and serving as guide slots for said disk being so arranged in the two blocks that they correspond to one another and form continuous slots in two extreme positions of displacement of said displaceable block, a notch being provided in said guide disk of such a width that the guide disk in a certain angular position of the spindle is axially displaceable past the two blocks between two limiting positions of the spindle, and a second notch in said guide disk of such a width that the guide disk in another angular position is axially displaceable past the fixed block, while the displaceable block is entrained by an axial step, and a spring actuating the displaceable block in such a manner that after displacement of said block by an axial step and adjustment of the guide disk with said second notch opposite said block, the block returns into the initial position.

21. An anti-pick lock according to claim 6, in which a guide disk is secured on the spindle, and the plurality of teeth directed radially to the spindle and disposed beside one another in the axial direction of the spindle are formed on a fixed block, and a block displaceable in the axial direction by an axial step, slots formed between said teeth and serving as guide slots for said disk being so arranged in the two blocks that they correspond to one another and form continuous slots in two extreme positions of displacement of said displaceable block, a notch being provided in said guide disk of such a width that the guide disk in a certain angular position of the spindle is axially displaceable past the two blocks between two limiting positions of the spindle, and a second notch in said guide disk of such a width that the guide disk in another angular position of the spindle is axially displaceable past the fixed block, while the displaceable block is entrained by an axial step, and in which a displaceable means cooperating with a key is provided for limiting the turning movements of the spindle in the one direction in each axial position of the spindle.

22. In an anti-pick lock, a rotatory and axially displaceable spindle extending through the door, tumblers adjusted into unlocked position by a single turning movement of a certain degree in one direction in each one of different axial positions of the spindle, members for guiding the spindle during its movements, so arranged that unlocking of the lock is effected by turning of the spindle and returning of the same in each axial position, an arm secured on the spindle and adapted to actuate the respective tumblers during the turning movements in the different axial positions of the spindle, a returning member for returning the tumblers into zero position, an abutment on said arm being adapted to engage said returning member in one extreme axial position of the spindle and to return said member and the tumblers into zero position on returning of the spindle in said extreme axial position.

23. In an anti-pick lock, a rotatory and axially displaceable spindle extending through the door, tumblers adjusted into unlocked position by a single turning movement of a certain degree in one direction in each one of different axial positions of the spindle, members for guiding the spindle during its movements so arranged that unlocking of the lock is effected by turning of the spindle and returning of the same in each axial position, an arm secured on the spindle and adapted to actuate the respective tumblers during the turning movements in the different axial positions of the spindle, a returning member rotatably mounted concentrically with the spindle for returning the tumblers into zero position, an abutment on said arm being adapted to engage said returning member in one extreme axial position of the spindle and to return said returning member and the tumblers into zero position on returning of the spindle in said extreme axial position.

OLOF ALFRED HAGE.